United States Patent
Resch et al.

(10) Patent No.: US 11,204,836 B1
(45) Date of Patent: Dec. 21, 2021

(54) USING TRAP SLICES FOR ANOMALY DETECTION IN A DISTRIBUTED STORAGE NETWORK

(71) Applicant: Pure Storage, Inc., Mountain View, CA (US)

(72) Inventors: Jason K. Resch, Chicago, IL (US); Adam M. Gray, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 167 days.

(21) Appl. No.: 16/542,946

(22) Filed: Aug. 16, 2019

Related U.S. Application Data

(63) Continuation-in-part of application No. 15/398,163, filed on Jan. 4, 2017, now Pat. No. 10,387,250, which is a continuation of application No. 14/549,253, filed on Nov. 20, 2014, now Pat. No. 9,552,261.

(60) Provisional application No. 61/933,953, filed on Jan. 31, 2014.

(51) Int. Cl.
   *G06F 11/10* (2006.01)
   *G06F 3/06* (2006.01)
   *G06F 11/14* (2006.01)

(52) U.S. Cl.
   CPC .......... *G06F 11/1076* (2013.01); *G06F 3/064* (2013.01); *G06F 3/067* (2013.01); *G06F 3/0619* (2013.01); *G06F 3/0644* (2013.01); *G06F 11/1088* (2013.01); *G06F 11/1092* (2013.01); *G06F 11/1464* (2013.01); *G06F 2211/1028* (2013.01)

(58) Field of Classification Search
   CPC ............. G06F 11/1076; G06F 11/0727; G06F 11/0751; G06F 11/26; G06F 2211/1007; G06F 2211/1028; G06F 11/0793; G06F 11/1016; G06F 11/1461; G06F 3/0614; G06F 3/0622
   See application file for complete search history.

(56) References Cited

U.S. PATENT DOCUMENTS

| 4,092,732 A | 5/1978 | Ouchi |
| 5,454,101 A | 9/1995 | Mackay |
| 5,485,474 A | 1/1996 | Rabin |

(Continued)

OTHER PUBLICATIONS

Chung; An Automatic Data Segmentation Method for 3D Measured Data Points; National Taiwan University; pp. 1-8; 1998.

(Continued)

*Primary Examiner* — Yolanda L Wilson
(74) *Attorney, Agent, or Firm* — Garlick & Markison; Timothy W. Markison; Kelly H. Hale

(57) ABSTRACT

A method for execution by a distributed storage (DS) unit of a dispersed storage network (DSN), includes receiving a set of write slice requests that includes a set of slice names that are not utilized to store encoded data slices (EDSs), where each write slice request from the set of slice names that are not utilized to store encoded data slices includes a trap slice. The method continues with an access slice request that includes a requested slice name being received from a second DSN client, and then continues by determining whether the requested slice name corresponds to a trap slice stored by the DS unit. When the requested slice name corresponds to a trap slice, an action is determined for the access slice request based on an anomaly processing scheme.

19 Claims, 6 Drawing Sheets

(56) References Cited

U.S. PATENT DOCUMENTS

| | | |
|---|---|---|
| 5,774,643 A | 6/1998 | Lubbers |
| 5,802,364 A | 9/1998 | Senator |
| 5,809,285 A | 9/1998 | Hilland |
| 5,890,156 A | 3/1999 | Rekieta |
| 5,987,622 A | 11/1999 | Lo Verso |
| 5,991,414 A | 11/1999 | Garay |
| 6,012,159 A | 1/2000 | Fischer |
| 6,058,454 A | 5/2000 | Gerlach |
| 6,128,277 A | 10/2000 | Bruck |
| 6,175,571 B1 | 1/2001 | Haddock |
| 6,192,472 B1 | 2/2001 | Garay |
| 6,256,688 B1 | 7/2001 | Suetaka |
| 6,272,658 B1 | 8/2001 | Steele |
| 6,301,604 B1 | 10/2001 | Nojima |
| 6,356,949 B1 | 3/2002 | Katsandres |
| 6,366,995 B1 | 4/2002 | Vilkov |
| 6,374,336 B1 | 4/2002 | Peters |
| 6,415,373 B1 | 7/2002 | Peters |
| 6,418,539 B1 | 7/2002 | Walker |
| 6,449,688 B1 | 9/2002 | Peters |
| 6,567,948 B2 | 5/2003 | Steele |
| 6,571,282 B1 | 5/2003 | Bowman-Amuah |
| 6,609,223 B1 | 8/2003 | Wolfgang |
| 6,718,361 B1 | 4/2004 | Basani |
| 6,760,808 B2 | 7/2004 | Peters |
| 6,785,768 B2 | 8/2004 | Peters |
| 6,785,783 B2 | 8/2004 | Buckland |
| 6,826,711 B2 | 11/2004 | Moulton |
| 6,879,596 B1 | 4/2005 | Dooply |
| 7,003,688 B1 | 2/2006 | Pittelkow |
| 7,024,451 B2 | 4/2006 | Jorgenson |
| 7,024,609 B2 | 4/2006 | Wolfgang |
| 7,080,101 B1 | 7/2006 | Watson |
| 7,103,824 B2 | 9/2006 | Halford |
| 7,103,915 B2 | 9/2006 | Redlich |
| 7,111,115 B2 | 9/2006 | Peters |
| 7,140,044 B2 | 11/2006 | Redlich |
| 7,146,644 B2 | 12/2006 | Redlich |
| 7,171,493 B2 | 1/2007 | Shu |
| 7,222,133 B1 | 5/2007 | Raipurkar |
| 7,240,236 B2 | 7/2007 | Cutts |
| 7,272,613 B2 | 9/2007 | Sim |
| 7,636,724 B2 | 12/2009 | de la Torre |
| 8,868,797 B1 | 10/2014 | Kirac |
| 2002/0062422 A1 | 5/2002 | Butterworth |
| 2002/0166079 A1 | 11/2002 | Ulrich |
| 2003/0018927 A1 | 1/2003 | Gadir |
| 2003/0037261 A1 | 2/2003 | Meffert |
| 2003/0065617 A1 | 4/2003 | Watkins |
| 2003/0084020 A1 | 5/2003 | Shu |
| 2004/0024963 A1 | 2/2004 | Talagala |
| 2004/0122917 A1 | 6/2004 | Menon |
| 2004/0215998 A1 | 10/2004 | Buxton |
| 2004/0228493 A1 | 11/2004 | Ma |
| 2005/0100022 A1 | 5/2005 | Ramprashad |
| 2005/0114594 A1 | 5/2005 | Corbett |
| 2005/0125593 A1 | 6/2005 | Karpoff |
| 2005/0131993 A1 | 6/2005 | Fatula, Jr. |
| 2005/0132070 A1 | 6/2005 | Redlich |
| 2005/0144382 A1 | 6/2005 | Schmisseur |
| 2005/0229069 A1 | 10/2005 | Hassner |
| 2006/0047907 A1 | 3/2006 | Shiga |
| 2006/0136448 A1 | 6/2006 | Cialini |
| 2006/0156059 A1 | 7/2006 | Kitamura |
| 2006/0224603 A1 | 10/2006 | Correll, Jr. |
| 2007/0079081 A1 | 4/2007 | Gladwin |
| 2007/0079082 A1 | 4/2007 | Gladwin |
| 2007/0079083 A1 | 4/2007 | Gladwin |
| 2007/0088970 A1 | 4/2007 | Buxton |
| 2007/0174192 A1 | 7/2007 | Gladwin |
| 2007/0214285 A1 | 9/2007 | Au |
| 2007/0234110 A1 | 10/2007 | Soran |
| 2007/0283167 A1 | 12/2007 | Venters, III |
| 2009/0094251 A1 | 4/2009 | Gladwin |
| 2009/0094318 A1 | 4/2009 | Gladwin |
| 2010/0023524 A1 | 1/2010 | Gladwin |
| 2011/0029711 A1 | 2/2011 | Dhuse |
| 2011/0286594 A1* | 11/2011 | Resch ............... G06F 11/10 380/46 |
| 2013/0238932 A1 | 9/2013 | Resch |
| 2014/0298135 A1 | 10/2014 | Dhuse |
| 2015/0006952 A1 | 1/2015 | Trichardt |
| 2015/0074463 A1* | 3/2015 | Jacoby ............. G06F 11/0727 714/37 |
| 2015/0156204 A1* | 6/2015 | Resch ............... H04L 63/0428 707/783 |
| 2015/0172386 A1 | 6/2015 | Palthepu |
| 2015/0355980 A1 | 12/2015 | Volvovski |
| 2016/0070719 A1 | 3/2016 | Resch |
| 2018/0067801 A1* | 3/2018 | Yun ................. G06F 11/1068 |
| 2019/0155701 A1* | 5/2019 | Motwani ........... G06F 11/1076 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

* cited by examiner

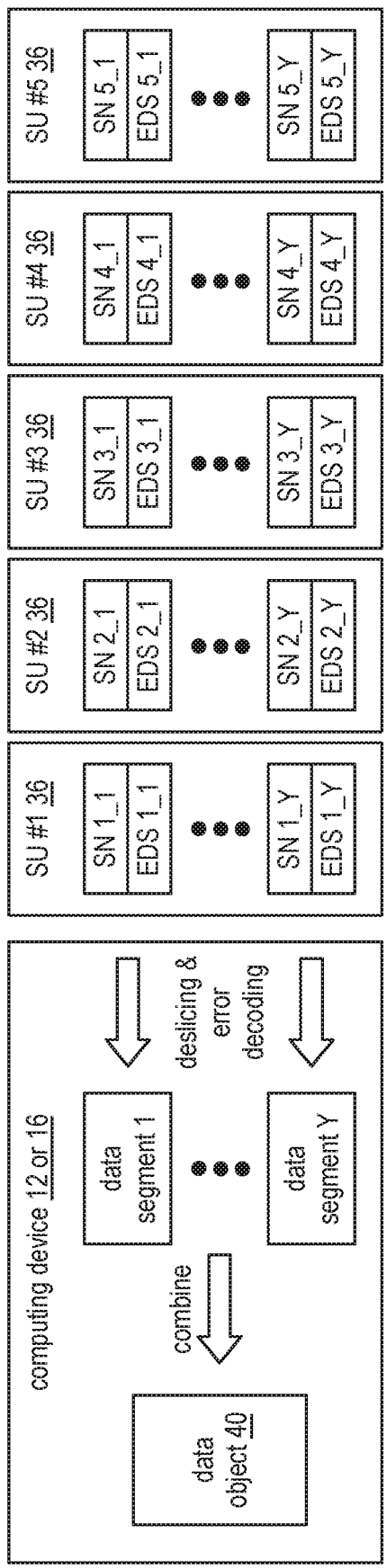
FIG. 7
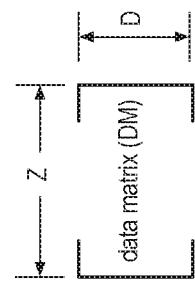
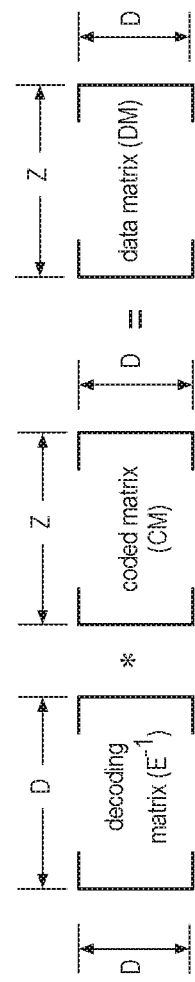
FIG. 8

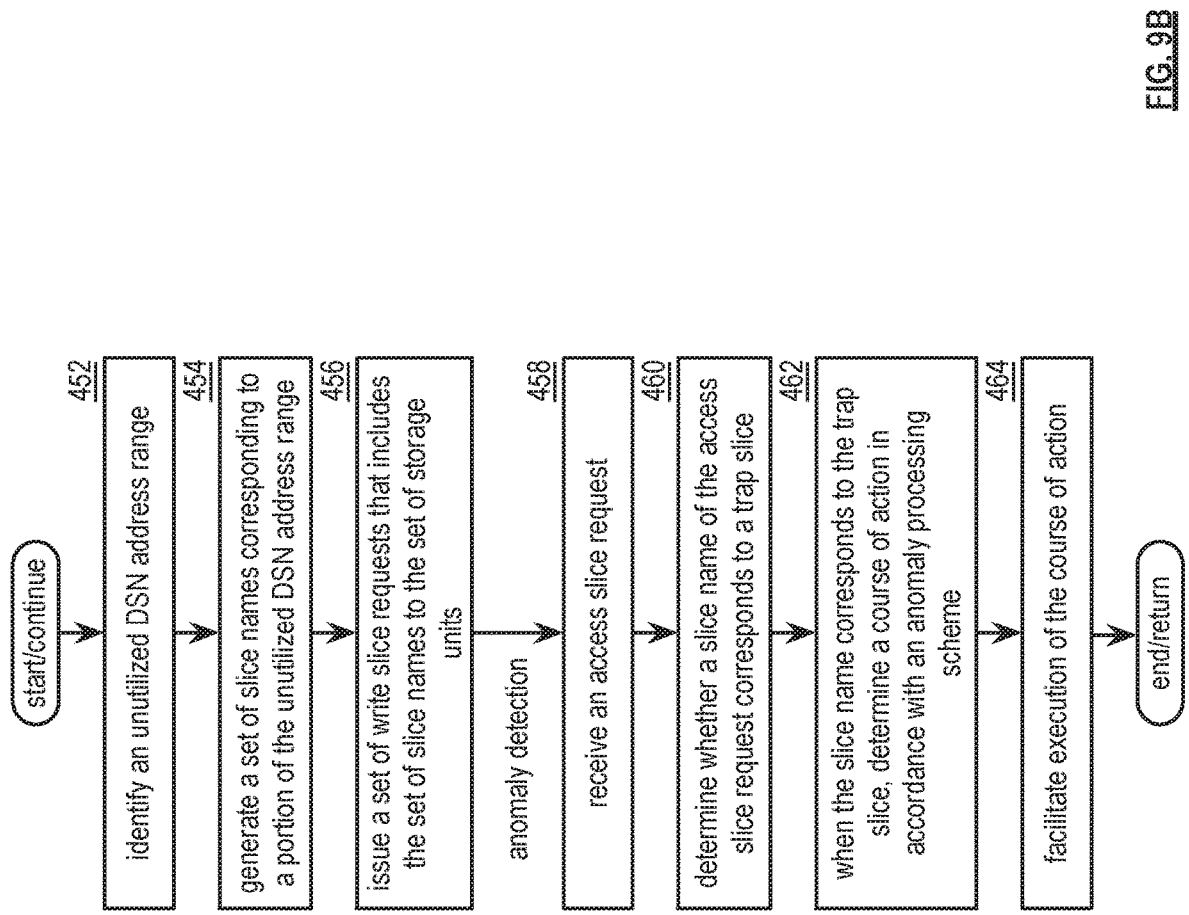

USING TRAP SLICES FOR ANOMALY DETECTION IN A DISTRIBUTED STORAGE NETWORK

CROSS REFERENCE TO RELATED PATENTS

The present U.S. Utility Patent application claims priority pursuant to 35 U.S.C. § 120 as a continuation-in-part of U.S. Utility application Ser. No. 15/398,163, entitled "Recovering Data From Microslices In A Dispersed Storage Network", filed Jan. 4, 2017, issuing as U.S. Pat. No. 10,387,250 on Aug. 20, 2019, which is a continuation of U.S. Utility application Ser. No. 14/549,253, entitled "Recovering Data From Microslices In A Dispersed Storage Network", filed Nov. 20, 2014, now U.S. Pat. No. 9,552,261 issued on Jan. 24, 2017, which claims priority pursuant to 35 U.S.C. § 119(e) to U.S. Provisional Application No. 61/933,953, entitled "Identifying Slice Errors Associated With A Dispersed Storage Network", filed Jan. 31, 2014, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Distributed storage systems are known to utilize protocol operations to modify the state of data elements over time. These systems are also known to use relocation operations to relocate data elements as needed for maintenance operations. Processing data elements can be dependent on the cumulative state of a given data element.

BRIEF DESCRIPTION OF THE SEVERAL VIEWS OF THE DRAWING(S)

FIG. 7 is a schematic block diagram of an example of dispersed storage error decoding of data in accordance with the present invention;

FIG. 8 is a schematic block diagram of a generic example of an error decoding function in accordance with the present invention;

FIG. 9B is a flowchart illustrating an example of detecting an anomaly in a dispersed storage network (DSN) in accordance with the present invention;

DETAILED DESCRIPTION OF THE INVENTION

Figure 1:
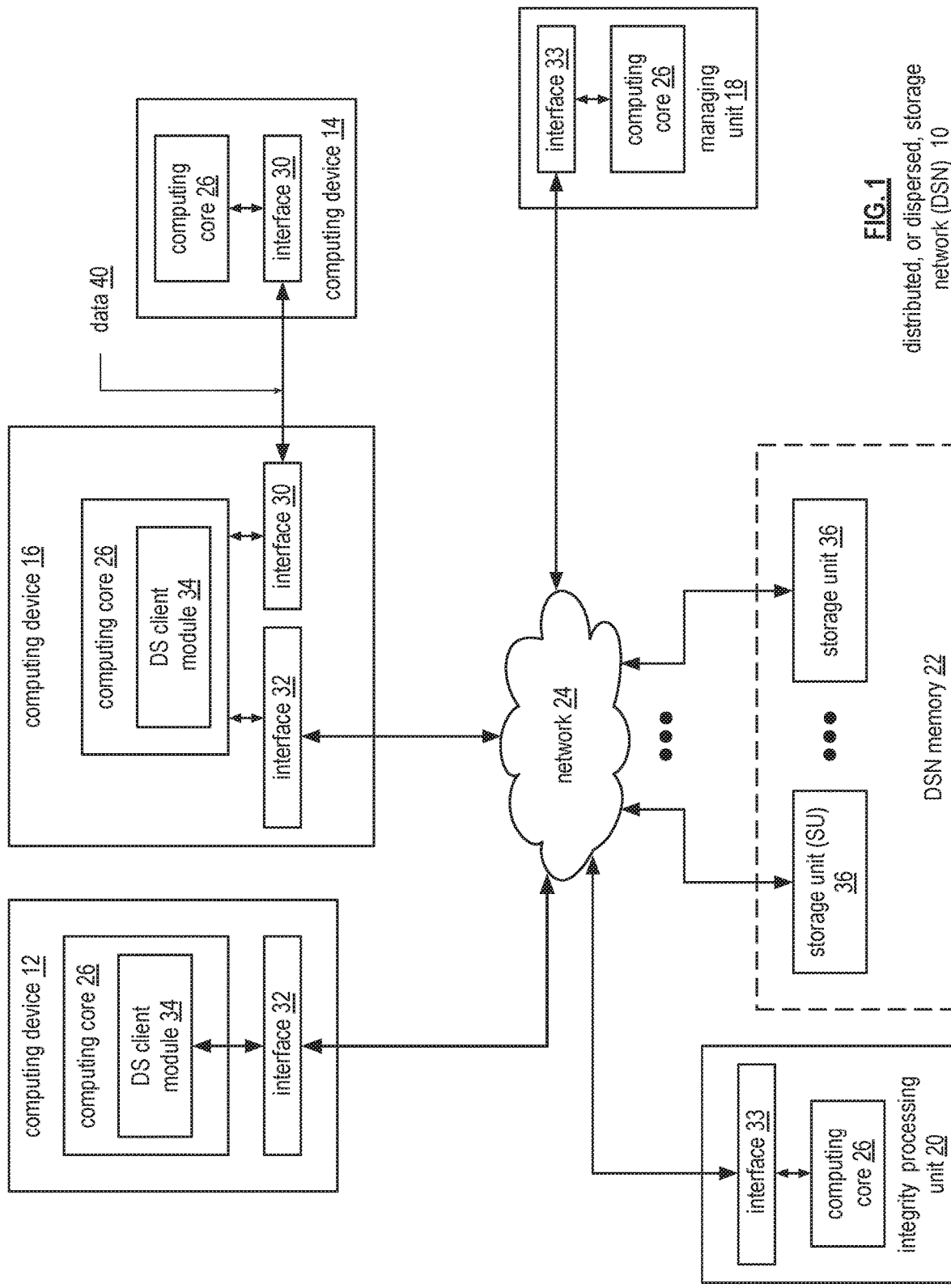
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
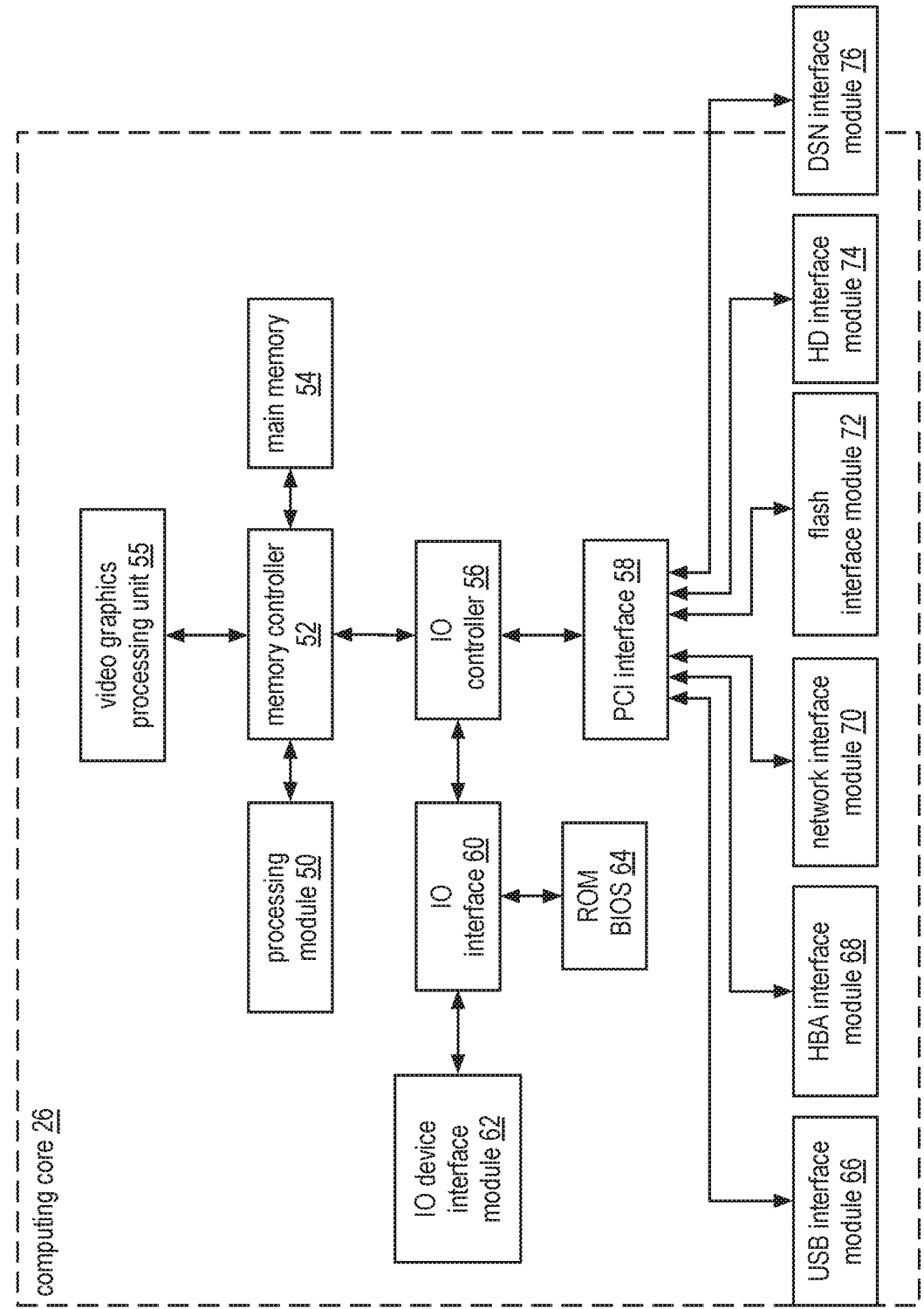
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figure 3:
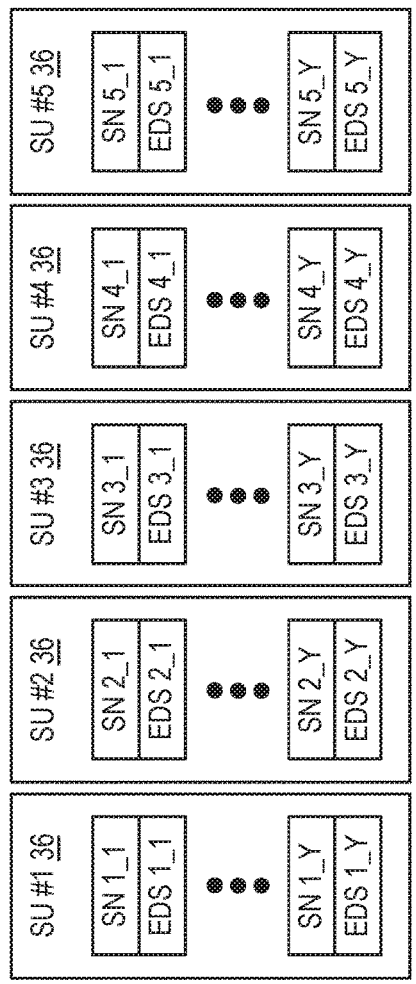
FIG. 3 is a schematic block diagram of an example of dispersed storage error encoding of data in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figure 4:
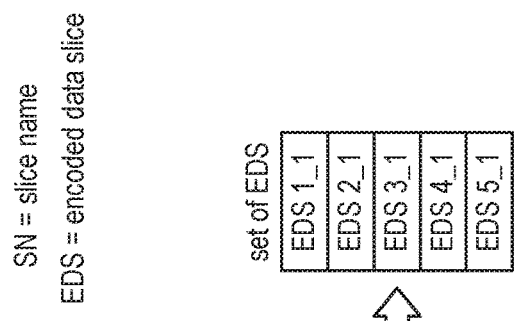
FIG. 4 is a schematic block diagram of a generic example of an error encoding function in accordance with the present invention.
Figure 5:
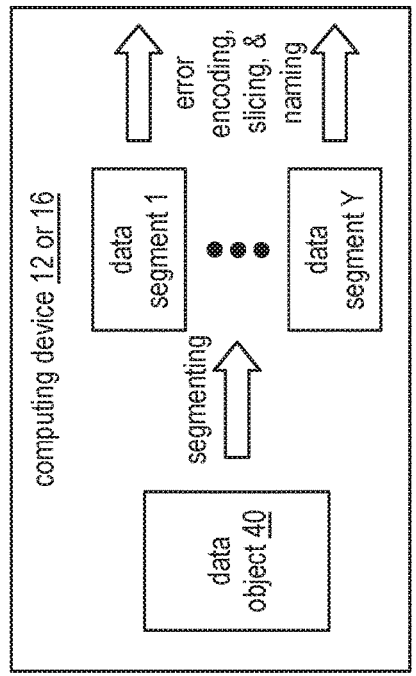
FIG. 5 is a schematic block diagram of a specific example of an error encoding function in accordance with the present invention.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Figure 6:
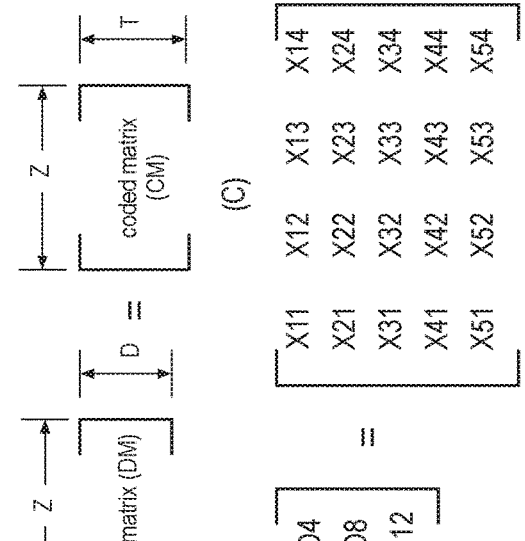
FIG. 6 is a schematic block diagram of an example of a slice name of an encoded data slice (EDS) in accordance with the present invention.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1–T), a data segment number (e.g., one of 1–Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
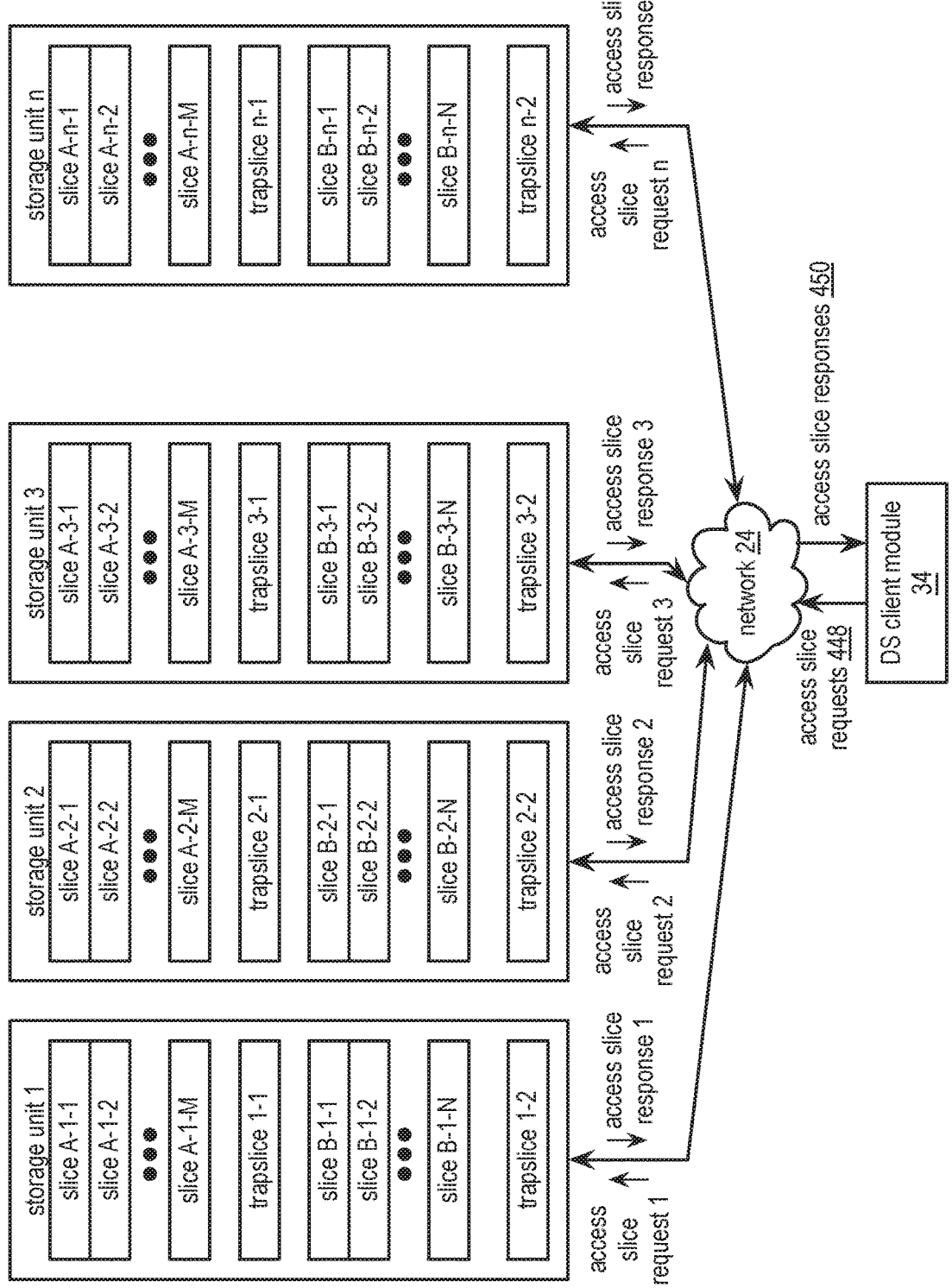
FIG. 9A is a schematic block diagram of a dispersed storage network (DSN) in accordance with the present invention.

FIG. 9A is a schematic block diagram of a dispersed storage network (DSN) that includes a set of storage units 1-n, the network 24 of FIG. 1, and the DS client module 34 of FIG. 1. Each storage unit may be implemented utilizing the storage unit 36 of FIG. 1. The DSN functions to detect anomalies with regards to accessing (e.g., write requests, read requests) the set of storage units 1-n.

In an example of operation, data is encoded to produce one or more sets of encoded data slices that are stored in the set of storage units. For example, the DS client module 34 dispersed storage error encodes a data object A to produce M sets of n encoded data slices for storage in the set of storage units 1-n, where a first set of encoded data slices are associated with slice names A-1-1, A-2-1, A-3-1, through A-n-1, and a second set of encoded data slices are associated with slice names A-1-2, A-2-2, A-3-2, through A-n-2, etc. In another example, the DS client module 34 dispersed storage error encodes a data object B to produce N sets of n encoded data slices for storage in the set of storage units.

Each storage unit is associated with storage of encoded data slices with slice names that correspond to a plurality of DSN address ranges assigned to the storage unit. A portion of each DSN address range may be utilized for storage of encoded data slices associated with slice names that fall within the DSN address range. Other portions of the DSN address range may be unutilized at any given time frame. For example, storage unit 1 is associated with storage of encoded data slices of slice names of a first DSN address range including slice names A-1-1, A-1-2, A-1-3, through A-1-M and a second DSN address range including slice names B-1-1, B-1-2, B-1-3 through B-1-N. As such, many unutilized slice names may exist between the first and second DSN address ranges.

In an example of the detecting the anomalies, the DS client module 34 identifies a set of unutilized slice names (e.g., not utilized for storing of encoded data slices associated with data objects A, B, and any other data objects presently stored in the set of storage units 1-n). The identifying may be based on one or more of interpreting a DSN directory, accessing a dispersed hierarchical index, accessing a list of utilized slice names, initiating a query, and interpreting a query response.

Having identified the set of unutilized slice names, the DS client module 34 issues a set of access slice requests 448 that includes the set of unutilized slice names, where the set of access slice requests includes a set of write slice requests, and each write slice request includes a corresponding slice name of the set of unutilized slice names and a trap slice. For example, the DS client module 34 issues a set of write slice requests 1-n to the set of storage units 1-n that includes trap slices 1-1 through n-1, to facilitate storage of the set of trap slices in the set of storage units 1-n. Alternatively, or in addition to, the DS client module 34 facilitates storage of a plurality of sets of trap slices in the set of storage units utilizing sets of unutilized slice names. Each storage unit receives a write slice request and stores a corresponding trap slice and a slice name associated with the trap slice.

Subsequent to receiving a trap slice of the one or more sets of trap slices, each storage unit receives another access slice request 448, where the other access slice request 448 includes a requested slice name and an operation code (e.g., an opcode associated with one or more of write, read, delete, list). The storage unit determines whether the requested slice name corresponds to a trap slice stored by the storage unit. For example, the storage unit compares the requested slice name to a list of stored slices and indicates that the requested slice name is associated with a stored trap slice when the requested slice name matches a slice name of the stored trap slice.

When the requested slice name corresponds to the trap slice, the storage unit determines a course of action in accordance with an anomaly processing scheme. The anomaly processing scheme includes one or more of shutting down the storage unit, disconnecting from the network 24, terminating a connection session with a requesting entity of the subsequent request, reporting the request, ignoring the request, and processing the request normally. The determining of the course of action may be based on one or more of a predetermination, receiving a request, interpreting a system registry, interpreting an error message, a requesting entity identifier, and receiving threat information. Having identified the course of action, the storage unit facilitates execution of the course of action. For example, the storage unit identifies the requesting entity as a rogue client and terminates a connection session with the identified rogue client.

When the requester slice name does not correspond to the trap slice, the storage unit issues an access slice response 450 based on the corresponding access slice request 448. For example, the storage unit issues the access slice response 450 to include an encoded data slice when the encoded data slice is not a trap slice.

FIG. 9B is a flowchart illustrating an example of detecting an anomaly in a dispersed storage network (DSN). The method begins at step 452 where a processing module (e.g., of a distributed storage and task (DS) client module) identifies an unutilized DSN address range across a set of storage units. The identifying may be based on one or more of accessing system registry information, initiating a query to the set of storage units, and interpreting query responses.

The method continues at step 454 where the processing module generates a set of slice names corresponding to a portion of the unutilized DSN address range. The generating includes selecting a source name within the DSN address range and generating the set of slice names based on the source name. The selecting of the source name includes at least one of identifying a source name that is least likely to be assigned for storage of data objects by modules of the DSN; selecting a random source name that corresponds to the DSN address range; retrieving the source name from a list of source names to be utilized for generation of slice names of trap slices; and receiving the source name.

The method continues at step 456 where the processing module issues a set of write slice requests to the set of storage units, where the set of write slice requests includes the set of slice names. The issuing includes generating a set of trap slices, generating the set of write slice requests to include the set of trap slices and the set of slice names, and sending the set of write slice requests to the set of storage units. The generating of the set of trap slices includes selecting trap data and encoding the trap data utilizing a dispersed storage error coding function to produce the set of trap slices. The trap data includes at least one of random data, null data, a predetermined trap slice value, a corresponding slice name of the trap slice, an identifier of the processing module, or any other identifier associated with a generation of the set of trap slices. The selecting of the trap data may be based on one or more of a predetermination, a system registry information, an estimated DSN threat level, the system performance level, retrieving the trap data, and receiving the trap data.

The method continues at step 458 where a storage unit of the set of storage units receives a subsequent access slice request. For example, the storage unit receives a read slice request from a requesting entity. The method continues at step 460 where the storage unit determines whether a slice name of the subsequent access slice request corresponds to a trap slice stored within the storage unit. For example, the storage unit compares the slice name to slice names of a list. As another example, the storage unit compares the trap slice of a write slice request to store trap slices when the storage unit receives the write slice request from a requesting entity.

When the slice name corresponds to the trap slice, the method continues at step 462 where the storage unit determines a course of action in accordance with an anomaly processing scheme. The determination of the anomaly processing scheme includes selecting the anomaly processing scheme based on one or more of an identifier of the requesting entity, a slice name, a vault ID associated with the slice name, a DSN status indicator, and an interpretation of an error message.

The method continues at step 464 where the storage unit facilitates execution of the course of action. For example, the storage unit issues and alert to a managing unit, issues the alert to other storage units of the set of storage units, and initiates disconnection of a connection associated with the requesting entity. As another example, the storage unit extracts addressing information from the connection associated with the requesting entity while processing the read slice request and generating a read slice response that includes a devised encoded data slice. The devised encoded data slice includes one or more of the stored trap slice, a predetermined encoded data slice value, a null encoded data slice, and a software algorithm that may be subsequently executed by the requesting entity (e.g., a Trojan horse software algorithm).

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a storage unit of a storage network, the method comprises:
   receiving a set of write slice requests that includes a set of slice identifiers that are not utilized to store encoded data slices (EDSs), wherein the storage unit is assigned a plurality of storage network address ranges for storing EDSs, wherein the set of slice identifiers that are not utilized to store EDS have been previously identified by a first storage network client and wherein each write slice request from the set of slice identifiers that are not utilized to store encoded data slices includes a trap slice;
   receiving, from a second storage network client, an access slice request, wherein the access slice request includes a requested slice identifier;
   determining whether the requested slice identifier corresponds to a trap slice stored by the storage unit;
   in response to a determination that the requested slice identifier corresponds to a trap slice, determining an action for the access slice request, wherein the action for the access slice request is based on an anomaly processing scheme; and
   in response to determining an action for the access slice request, executing the action for the access slice request.

2. The method of claim 1, wherein the anomaly processing scheme includes at least one of shutting down the storage unit, disconnecting the storage unit from the storage network, terminating a connection session with a requesting entity of a request, reporting the request and ignoring the request.

3. The method of claim 1, wherein the determining whether the requested slice identifier corresponds to a trap slice stored by the storage unit comprises:
comparing the requested slice identifier to a list of stored EDSs; and
determining whether the requested slice identifier is associated with a stored trap slice.

4. The method of claim 1, wherein the determining an action for the access slice request is based on at least one of a predetermination, receiving a request, interpreting a system registry, interpreting an error message, a requesting an entity identifier, and receiving threat information from the storage network.

5. The method of claim 1, wherein the executing the action for the access slice request includes terminating a connection session with the second storage network client.

6. The method of claim 1, wherein the executing the action for the access slice request includes identifying the second storage network client as a rogue client.

7. The method of claim 1 further comprises:
in response to a determination that the requested slice identifier does not correspond to a trap slice, issuing an access response that includes an EDS.

8. The method of claim 1, wherein the first storage network client identified the set of slice identifiers that are not utilized to store EDS based on at least one of interpreting a storage network directory, accessing a dispersed hierarchical index, accessing a list of utilized slice identifiers, initiating a query, and interpreting a query response.

9. A non-transitory computer readable memory of a storage network comprises:
a first memory section that stores operational instructions that, when executed by a computing device of a distributed storage unit, causes the computing device to:
receive a set of write slice requests that includes a set of slice identifiers that are not utilized to store encoded data slices (EDSs), wherein the storage unit is assigned a plurality of storage network address ranges for storing EDSs, wherein the set of slice identifiers that are not utilized to store EDS have been previously identified by a first storage network client and wherein each write slice request from the set of slice identifiers that are not utilized to store encoded data slices includes a trap slice; and
execute the write slice request;
a second memory section that stores operational instructions that, when executed by the computing device, causes the computing device to:
receive, from a second storage network client, an access slice request, wherein the access slice request includes a requested slice identifier;
determine whether the requested slice identifier corresponds to a trap slice stored by the storage unit; and
a third memory section that stores operational instructions that, when executed by the computing device, causes the computing device to:
when the requested slice identifier corresponds to a trap slice, determine an action for the access slice request, wherein the action for the access slice request is based on an anomaly processing scheme; and
when an action for the access slice request has been determined, execute the action for the access slice request.

10. The non-transitory computer readable memory of claim 9, wherein the anomaly processing scheme includes at least one of shutting down the storage unit, disconnecting the storage unit from the storage network, terminating a connection session with a requesting entity of a request, reporting the request and ignoring the request.

11. The non-transitory computer readable memory of claim 9 wherein the third memory section further stores operational instructions that, when executed by the computing device, causes the computing device to:
determine the action for the access slice request based on at least one of a predetermination, receiving a request, interpreting a system registry, interpreting an error message, a requesting an entity identifier, and receiving threat information from the storage network.

12. The non-transitory computer readable memory of claim 9 wherein the third memory section further stores operational instructions that, when executed by the computing device, causes the computing device to:
identify the second storage network client as a rogue client.

13. The non-transitory computer readable memory of claim 9 further comprising:
a fourth memory section that stores operational instructions that, when executed by the computing device causes the computing device to:
when the requested slice identifier does not correspond to a trap slice, issue an access response that includes an EDS.

14. The non-transitory computer readable memory of claim 9 wherein the set of slice identifiers that are not utilized to store EDS is identified by the first storage network client based on at least one of interpreting a storage network directory, accessing a dispersed hierarchical index, accessing a list of utilized slice identifiers, initiating a query, and interpreting a query response.

15. A computing device of a storage network comprises:
an interface for interfacing with a network;
memory; and
a processing module operably coupled to the interface and to the memory, wherein the processing module is operable to:
identify an unutilized storage network address range across a set of distributed storage units;
generate a set of slice identifiers corresponding to a portion of the unutilized storage network address range;
generate a set of trap slices, wherein a trap slice is an encoded data slice (EDS) adapted for use in an anomaly processing scheme; and
issue a set of write slice requests to the set of storage units, wherein each write slice request of the set of write slice requests includes one or more slice identifiers that are not utilized to store encoded data slices and a trap slice.

16. The computing device of claim 15, wherein the processing module is further operable to:
select a source name within a storage network address range set of slice identifiers corresponding to a portion of the unutilized storage network address range and generate the set of slice identifiers, wherein the set of slice names corresponding to a portion of the unutilized storage network address range is based on the source name.

17. The computing device of claim 15, wherein the processing module is further operable to:
select trap data; and
encode the trap data using a dispersed storage error coding function to create the set of trap slices.

18. The computing device of claim 17, wherein the trap data includes at least one of random data, null data, a predetermined trap slice value, a corresponding slice identifier of the trap slice, an identifier of the processing module and an identifier associated with a generation of the set of trap slices.

19. The computing device of claim 17, wherein the trap data is selected based on at least one of a predetermination, a system registry information, an estimated storage network threat level, a system performance level, retrieved trap data, and receiving of trap data.

\* \* \* \* \*